United States Patent
Koo et al.

(10) Patent No.: US 7,970,005 B2
(45) Date of Patent: Jun. 28, 2011

(54) CHANNEL BONDING RECEIVING APPARATUS AND METHOD FOR EXPANDING CHANNEL BONDING RECEIVING BAND

(75) Inventors: Han-Seung Koo, Daejon (KR); Yang-Su Kim, Daejon (KR); Doh-Wook Kim, Daejon (KR); Yun-Jeong Song, Daejon (KR); Soo-In Lee, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 154 days.

(21) Appl. No.: 12/237,528

(22) Filed: Sep. 25, 2008

(65) Prior Publication Data
US 2009/0109997 A1 Apr. 30, 2009

(30) Foreign Application Priority Data

Oct. 25, 2007 (KR) .................. 10-2007-0107683

(51) Int. Cl.
*H04J 3/00* (2006.01)
*H04J 3/16* (2006.01)
(52) U.S. Cl. .................................................. 370/464
(58) Field of Classification Search .................. 370/464, 370/468
See application file for complete search history.

(56) References Cited

U.S. PATENT DOCUMENTS

| 6,791,995 | B1 * | 9/2004 | Azenkot et al. | 370/436 |
| 6,898,755 | B1 * | 5/2005 | Hou | 714/784 |
| 7,017,176 | B1 * | 3/2006 | Lee et al. | 725/111 |
| 7,782,898 | B2 * | 8/2010 | Chapman et al. | 370/468 |
| 2002/0159513 | A1 * | 10/2002 | Williams et al. | 375/222 |
| 2006/0088056 | A1 * | 4/2006 | Quigley et al. | 370/468 |
| 2006/0182139 | A1 * | 8/2006 | Bugajski et al. | 370/464 |
| 2006/0276149 | A1 | 12/2006 | Womac et al. | |
| 2007/0098007 | A1 * | 5/2007 | Prodan et al. | 370/443 |

FOREIGN PATENT DOCUMENTS

| KR | 1020030084988 A | 11/2003 |
| KR | 1020070099042 A | 10/2007 |

OTHER PUBLICATIONS

"MT2170 Single-Chip DOCSIS 3.0 Wideband Tuner", MT2170 PB-00144-REV 1.0, Mar. 2007.
"Data Over Cable Service Interface Specifications DOCSIS 3.0", Physical Layer Specification CM-SP-PHYv3.0-I06-080215, Aug. 2006 pp. I-150.

* cited by examiner

*Primary Examiner* — Derrick W Ferris
*Assistant Examiner* — Angel Brockman
(74) *Attorney, Agent, or Firm* — Ladas & Parry LLP

(57) ABSTRACT

Provided is a channel bonding receiving apparatus and method for expanding a channel bonding receiving band in a cable modem. The channel bonding receiving apparatus includes a channel bonding dividing unit for dividing a channel bonding broadband signal into a plurality of band signals and extracting a corresponding channel bonding signal from each of the divided band signals; and a channel routing unit for routing each of the extracted channel bonding signals to a corresponding demodulator.

13 Claims, 3 Drawing Sheets

CHANNEL BONDING RECEIVING APPARATUS AND METHOD FOR EXPANDING CHANNEL BONDING RECEIVING BAND

CROSS-REFERENCE TO RELATED APPLICATIONS

The present invention claims priority of Korean Patent Application No. 10-2007-0107683, filed on Oct. 25, 2007, which is incorporated herein by reference.

BACKGROUND OF THE INVENTION

1. Field of the Invention

The present invention relates to a channel bonding receiving apparatus and method for expanding a channel bonding receiving band in a cable modem; and more particularly, to a channel bonding receiving apparatus and method for expanding a channel bonding receiving band, which expands a receiving band range (i.e., a channel bonding receiving band range) capable of receiving a broadband signal containing a channel bonding signal and thus can support a free channel bonding arrangement in a transmitting side.

This work was supported by the IT R&D program of MIC/IITA [2006-S-019-02, "The Development of Digital Cable Transmission and Receive System for 1 Gbps Downstream"].

2. Description of Related Art

Data Over Cable Service Interface Specification (DOCSIS) 3.0 is a technology that provides an Internet speed of above 150 Mbps for downlink and above 120 Mbps for uplink in a hybrid fiber-coaxial (HFC) network. The DOCSIS 3.0 physical layer specification was issued by CableLabs in August 2006 and recently updated in February 2008.

The DOCSIS 3.0 uses a channel bonding technique that transmits a number of 6-MHz band signals in a binding manner. Unlike the pre-existing DOCSIS 2.0, the DOCSIS 3.0 requires a complicated media access control (MAC) technique and a technique for a physical layer (PHY) including a radio frequency (RF) tuner and a digital demodulator, in order for a receiving terminal support the channel bonding technique.

A cable modem for up to the DOCSIS 2.0 receives a 54~864 MHz band signal from an HFC network, down-converts the 54~864 MHz band signal into an intermediate frequency (IF) signal (generally 44 MHz) by means of an RF tuner, and digital-demodulates the dunned 6-MHz band signal.

However, from the DOCSIS 3.0, a PHY section simultaneously receives signals obtained by bonding four or more channels, digitizes the received signals, and hands the resulting signals to a MAC module. To this end, as illustrated in FIG. 1, a PHY section of a conventional DOCSIS 3.0 cable modem includes: a broadband RF tuner 101 for tuning a broadband signal; an analog-to-digital (A/D) converter 102 for converting an analog signal into a digital signal; a digital channelizer 103 for selecting (or extracting) only a bonded channel from a tuned band; and a demodulator unit 11 including four or more demodulators.

If an MT2170 DOCSIS 3.0 broadband tuner, which was issued by Microtune Inc. in March 2007, is used as the broadband RF tuner 101, a DOCSIS 3.0 bonding channel receiving structure illustrated in FIG. 1 can receive a channel bonded within an up to 100-MHz band.

However, when considering the fact that a DOCSIS 3.0 downlink frequency band is of 101~876 MHz, the restriction that channel bonding can be supported only within a 100-MHz band increases the inflexibility in a system operation such as load balancing.

For example, in case of using an MT2170 tuner as the broadband RF tuner 101, if a system operator locates one bonding channel at 500 MHz, other bonding channels must be located in a 400~500-MHz band or a 500~600-MHz band. In this case, if other bonding channels are located at 300 MHz, a difference with a 500-MHz band exceeds 100 MHz, thus making it impossible for the cable modem to receive all the bonding channels.

As described above, since a receiving band range (i.e., a channel bonding receiving band range) capable of receiving a broadband signal (e.g., a cable signal transmitted through an HFC network) containing a channel bonding signal is narrow and restricted, the conventional channel bonding receiving technology cannot support a free channel bonding arrangement in a transmitting side.

SUMMARY OF THE INVENTION

An embodiment of the present invention is directed to providing a channel bonding receiving apparatus and method for expanding a channel bonding receiving band, which expands a receiving band range (i.e., a channel bonding receiving band range) capable of receiving a broadband signal containing a channel bonding signal and thus can support a free channel bonding arrangement in a transmitting side.

To this end, the present invention divides a channel bonding broadband signal into a plurality of band signals having different frequency ranges, extracts a corresponding channel bonding signal from each of the divided band signals, and transmits the extracted channel bonding signals respectively to the corresponding demodulators, thereby expanding a receiving band range capable of receiving a channel bonding signal.

In accordance with an aspect of the present invention, there is provided a channel bonding receiving apparatus for expanding a channel bonding receiving band, including: a channel bonding dividing unit for dividing a channel bonding broadband signal into a plurality of band signals and extracting a corresponding channel bonding signal from each of the divided band signals; and a channel routing unit for routing each of the extracted channel bonding signals to a corresponding demodulator.

In accordance with another aspect of the present invention, there is provided a channel bonding receiving method for expanding a channel bonding receiving band, including: performing a tuning operation for dividing a channel bonding broadband signal into a plurality of band signals with different frequency ranges and down-converting the divided band signals in a separate manner; performing an analog-to-digital converting operation for converting each of the down-converted band signals into a digital band signal; performing a channelizing operation for extracting a corresponding channel bonding signal from each of the digital band signals; and performing a signal allocating operation for allocating each of the extracted channel bonding signals to a corresponding demodulator.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

DESCRIPTION OF SPECIFIC EMBODIMENTS

The present invention relates to a DOCSIS 3.0 supporting receiver, i.e., a PHY front-end section from an RF tuner unit to a digital demodulator in a cable modem. The present invention expands a channel bonding receiving band range, thereby making it possible to provide a freer bonding channel arrangement in a DOCSIS 3.0 system operation than the conventional technology.

The advantages, features and aspects of the invention will become apparent from the following description of the embodiments with reference to the accompanying drawings, which is set forth hereinafter. Therefore, those skilled in the field of this art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

Figure 2:
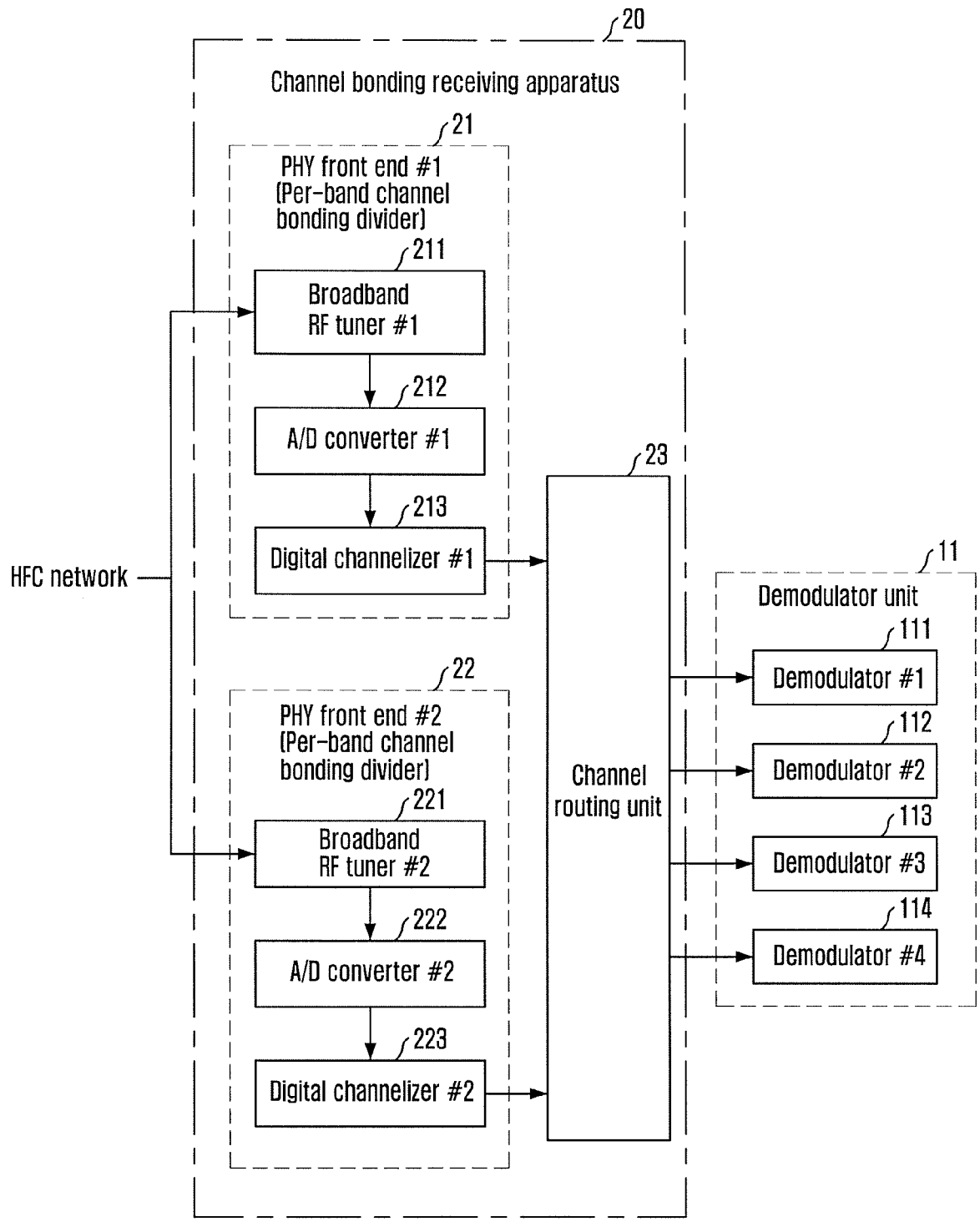
FIG. 2 is a block diagram of a DOCSIS 3.0 channel bonding receiving apparatus for expanding a channel bonding receiving band in a cable modem in accordance with an embodiment of the present invention.

FIG. 2 is a block diagram of a DOCSIS 3.0 channel bonding receiving apparatus for expanding a channel bonding receiving band in a cable modem in accordance with an embodiment of the present invention.

Referring to FIG. 2, a DOCSIS 3.0 channel bonding receiving apparatus 20 in accordance with an embodiment of the present invention includes a channel bonding dividing unit and a channel routing unit 23 in order to be able to support a DOCSIS 3.0 standard providing a free channel bonding arrangement in a cable modem.

First, the channel bonding dividing unit will be described in detail.

The channel bonding dividing unit divides a channel bonding broadband signal (i.e., a cable signal containing a channel bonding signal) into a plurality of band signals having different frequency ranges, and extracts a corresponding channel bonding signal from each of the divided band signals. The channel bonding dividing unit includes a plurality of PHY front ends (i.e., a plurality of channel bonding dividers for the respective bands).

The first PHY front end, i.e., the first channel bonding divider, 21 includes a first broadband RF tuner 211, a first analog-to-digital (A/D) converter 212, and a first digital channelizer 213. Also, the second PHY front end, i.e., the second channel bonding divider, 22 includes a second broadband RF tuner 221, a second analog-to-digital (A/D) converter 222, and a second digital channelizer 223.

The first or second broadband RF tuners 211 or 221 extracts (or captures) a band signal of a predetermined frequency band from a cable signal received from an HFC network, and down-converts the extracted band signal such that a center frequency of the extracted band signal is located in an intermediate frequency (IF) band. For example, according to a separate band tuning command, the first and second broadband RF tuners 211 and 221 extract band signals of different frequency bands (see reference numerals 31 and 32 in FIG. 3), and down-converts the extracted band signals such that all of the extracted band signals are down-converted to the same IF band $IF_1$.

The first A/D converter 212 receives the down-converted band signal, i.e., an analog band signal, from the first broadband RF tuner 211 and converts the down-converted band signal into a digital band signal. Also, the second A/D converter 222 receives the down-converted band signal, i.e., an analog band signal, from the second broadband RF tuner 221 and converts the down-converted band signal into a digital band signal.

Then, according to an external channel selection command, the first digital channelizer 213 extracts a corresponding channel bonding signal, i.e., a channel bonding signal contained in the corresponding digital band signal, from the digital band signal received from the first A/D converter 212. Also, according to the external channel selection command, the second digital channelizer 223 extracts a corresponding channel bonding signal, i.e., a channel bonding signal contained in the corresponding digital band signal, from the digital band signal received from the second A/D converter 222 (see FIG. 3).

The channel routing unit 23 will now be described in detail.

The channel routing unit 23 receives the extracted channel bonding signals from the first and second PHY front ends 21 and 22, and transmits the respective channel bonding signals to a plurality of demodulators 111 to 114 according to an external channel routing command. That is, the channel routing unit 23 corresponds to an interconnection network module that interconnects a plurality of the PHY front ends 21 and 22 with a plurality of the demodulators 111 to 114 according to an external channel routing command.

Figure 1:
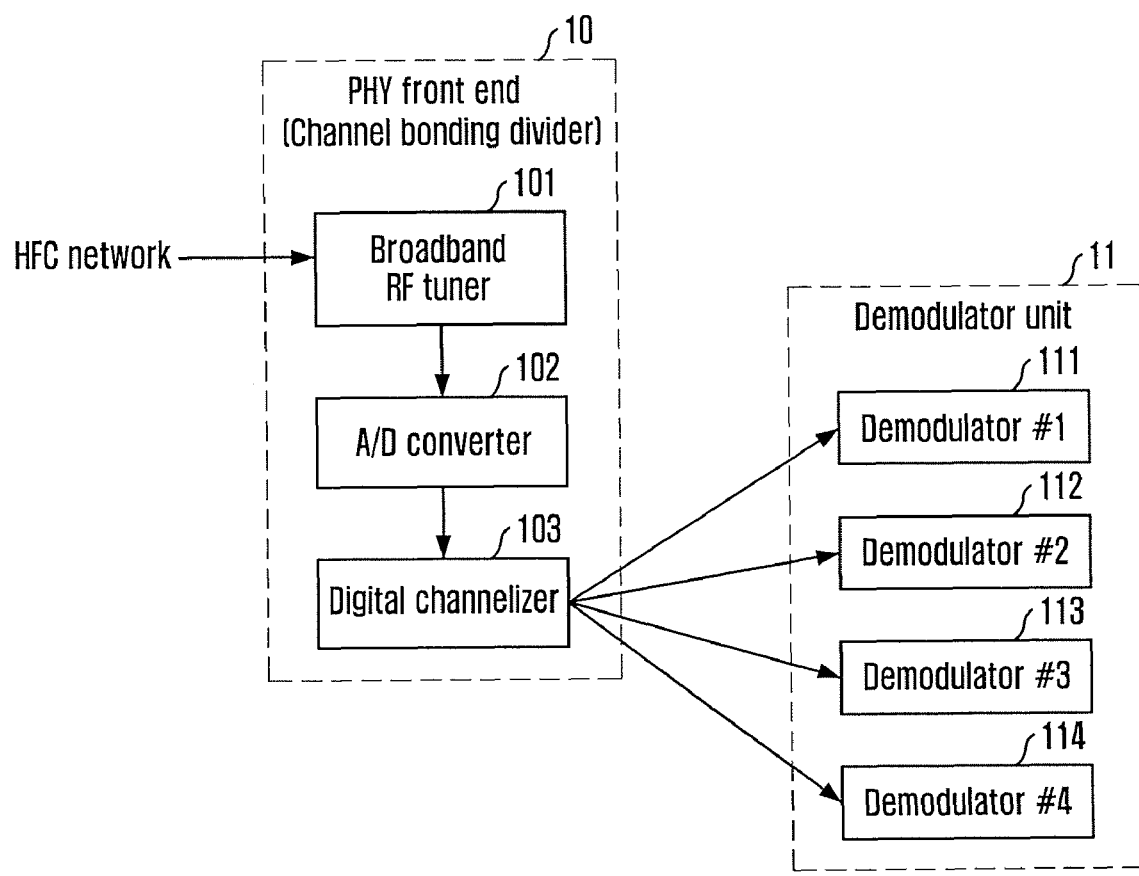
FIG. 1 is a block diagram of a PHY front end of a conventional DOCSIS 3.0 cable modem.

In summary, the DOCSIS 3.0 PHY front end 21 or 22 in accordance with the present invention has following differences from the conventional DOCSIS 3.0 PHY front end (see FIG. 1).

First, unlike the conventional PHY front-end structure, the channel bonding receiving apparatus 20 of the present invention includes two or more PHY front ends 21 and 22. Although two PHY front ends have been illustrated in FIGS. 2 and 3, those skilled in the art will readily understand that the number of the PHY front ends can increase as occasion demands.

Second, the channel bonding receiving apparatus 20 of the present invention includes the channel routing unit 23 between the PHY front ends 21 and 22 and the demodulators 111 to 114, so that route setting is performed to transmit the channel bonding signals to the corresponding demodulators. In this way, since the channel bonding receiving apparatus 20 of the present invention includes the channel routing unit 23 corresponding to an interconnection network module, it is possible to use as many demodulators as conventionally used.

Figure 3:
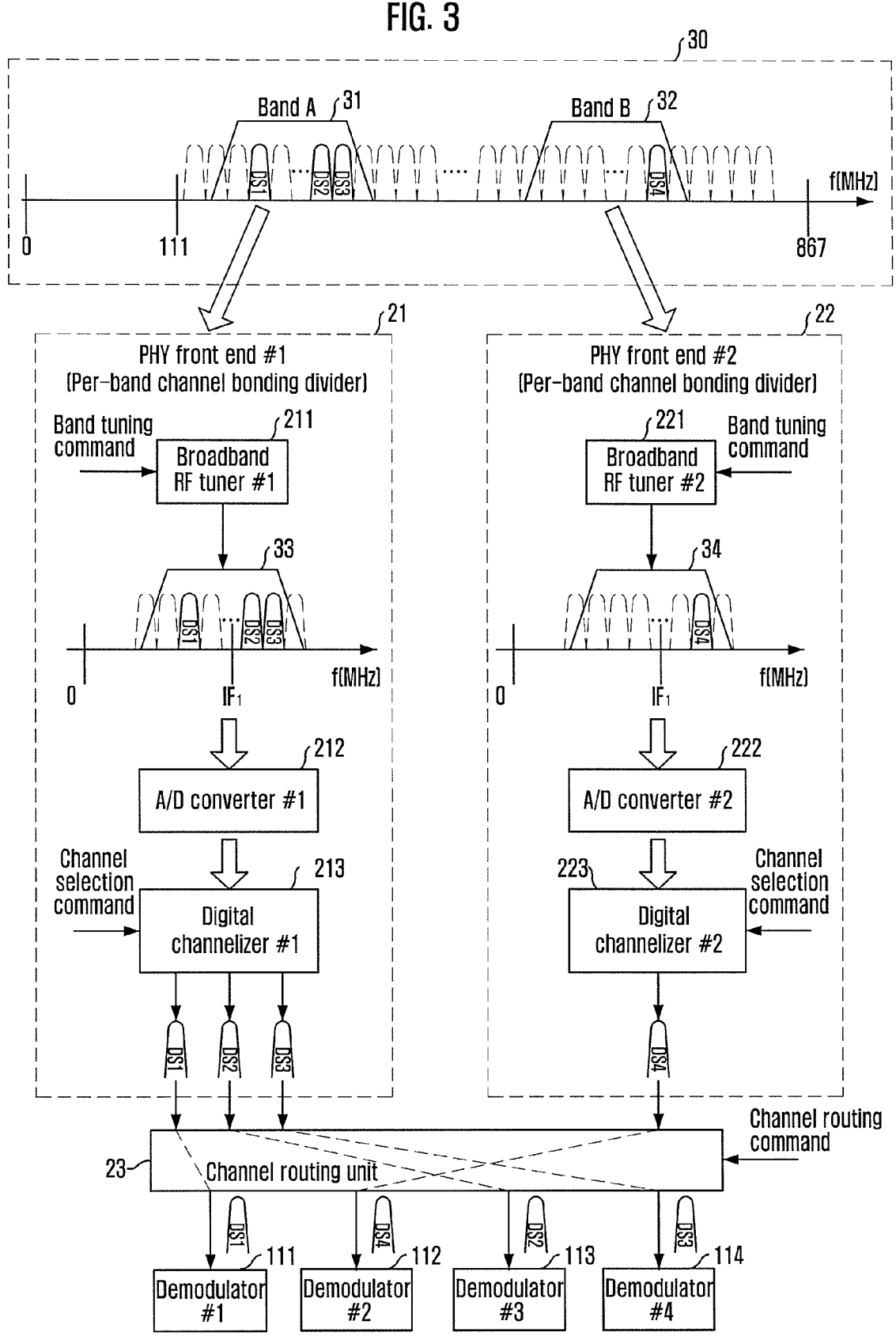
FIG. 3 is a diagram illustrating a DOCSIS 3.0 channel bonding receiving method for expanding a channel bonding receiving band in a cable modem in accordance with an embodiment of the present invention.

FIG. 3 is a diagram illustrating a DOCSIS 3.0 channel bonding receiving method for expanding a channel bonding receiving band in a cable modem in accordance with an embodiment of the present invention. In detail, FIG. 3 illustrates a channel bonding receiving method performed in a channel bonding receiving apparatus (see FIG. 2) that corresponds to a PHY front end of a cable modem.

First, the channel bonding receiving apparatus 20 (specifically the first and second broadband RF tuners 211 and 221) of a DOCSIS 3.0 cable modem receives a cable signal (i.e., a channel bonding broadband signal) 30 containing a DOCSIS 3.0 channel bonding signal from an HFC network. Herein, the cable signal 30 contains four channels DS1, DS2, DS3 and DS4 for DOCSIS 3.0 channel bonding. Specifically, the three channels DS1, DS2 and DS3 are contained in a band A 31 and the channel DS4 is contained in a band B 32.

A band-A signal is set to be routed to a first PHY front end 21, while a band-B signal is set to be routed to a second PHY front end 22.

The first broadband RF tuner 211 included in the first PHY front end 21 down-converts the band A 31 to a frequency band 33 with a center frequency of $IF_1$ [MHz] according to a band tuning command.

Likewise, the second broadband RF tuner 221 included in the second PHY front end 22 down-converts the band B 32 to a frequency band 34 with a center frequency of $IF_1$ [MHz] according to a band tuning command.

Thereafter, the first A/D converter 212 converts the down-converted band A 33 into a digital signal. Also, the second A/D converter 222 converts the down-converted band B 34 into a digital signal.

Thereafter, the first digital channelizer 213 included in the first PHY front end 21 extracts DOCSIS 3.0 channel bonding signals DS1, DS2 and DS3 contained in the band A 33 according to a channel selection command.

Likewise, the second digital channelizer 223 included in the second PHY front end 22 extracts a DOCSIS 3.0 channel bonding signal DS4 contained in the band B 34 according to a channel selection command.

After the channel bonding signals are extracted by the first and second PHY frond ends 21 and 22 as described above, the channel routing unit 23 routes the extracted channel bonding signals to the corresponding demodulators 111 to 114 according to a channel routing command.

In an embodiment illustrated in FIG. 3, the channel bonding signals DS1, DS2, DS3 and DS4 are routed respectively to the first, second, third and fourth demodulators 111, 112, 113 and 114.

Although two PHY front ends 21 and 23 have been illustrated in FIGS. 2 and 3, those skilled in the art will readily understand that the channel bonding receiving apparatus 20 of the present invention may include three or more PHY front ends as occasion demands.

As described above, the present invention uses a plurality of the PHY front ends and the channel routing unit in operating the DOCSIS 3.0 system, thereby making it possible a channel bonding receiving band range. Thus, it is possible to support a freer bonding channel arrangement in a transmitting side than the conventional technology.

Also, the present invention makes it possible for the DOCSIS 3.0 system to locate bonding channels in a band that expands by (the range to be able to be captured by the broadband RF tuners)×(the number of the PHY front ends), and makes it possible for the cable modem (i.e., the receiver) to receive the bonding channels without increasing the number of the demodulators.

In summary, even when a plurality of conventional PHY front ends are used, the present invention is not restricted by the fact that an interval between the bonding channels must be within a 100-MHz band. Also, the present invention additionally uses the channel routing unit to interconnect the bonding channels with the demodulators. Thus, the present invention makes it possible to input the desired bonding channels into the corresponding demodulators, thereby increasing the system flexibility.

The method of the present invention may be programmed in a computer language. Codes and code segments constituting the computer program may be easily inferred by a computer programmer skilled in the art. Furthermore, the computer program may be stored in a computer-readable recording medium including all kinds of media such as CD-ROM, RAM, ROM, floppy disk, hard disk and magneto-optical disk, and read and executed by a computer to embody the methods.

While the present invention has been described with respect to the specific embodiments, it will be apparent to those skilled in the art that various changes and modifications may be made without departing from the spirit and scope of the invention as defined in the following claims.

What is claimed is:

1. A channel bonding receiving apparatus comprising:
   a channel bonding dividing unit for receiving a channel broadband signal in a single cable modem,
   where the channel broadband signal has at least one or more channel bonding signals bonded to each of at least two or more different frequency bands,
   wherein the channel bonding dividing unit divides the channel bonding broadband signal into a plurality of band signals, and extracting a corresponding channel bonding signal from each of the divided band signals; and
   a channel routing unit for routing each of the extracted channel bonding signals to a corresponding demodulator; and
   the channel bonding dividing unit comprises a plurality of per-band channel bonding dividers for respectively dividing the band signals from the channel bonding broadband signal by each frequency bands of the different frequency bands, and respectively extracting the channel bonding signals contained respectively in the different frequency bands from the band signals.

2. The channel bonding receiving apparatus of claim 1, wherein each of the per-band channel bonding dividers respectively comprises:
   a tuning unit for dividing a band signal corresponding to a predetermined frequency band in the different frequency bands from the channel bonding broadband signal, and down-converting the divided band signal;
   an analog-to-digital converting unit for converting the down-converted band signal into a digital band signal; and
   a digital channelizing unit for extracting a channel bonding signal corresponding to the predetermined frequency band from the digital band signal.

3. The channel bonding receiving apparatus of claim 2, wherein each of the tuning units down-converts the divided band signal such that a center frequency of the divided band signal is located in an intermediate frequency (IF) band.

4. The channel bonding receiving apparatus of claim 3, wherein the tuning units respectively down-convert the divided band signals such that the band signals are down-converted to the same IF band.

5. The channel bonding receiving apparatus of claim 2, wherein each of the tuning units divides the band signal corresponding to the predetermined frequency band according to a separately-input band tuning command.

6. The channel bonding receiving apparatus of claim 2, wherein each of the digital channelizing units extracts the channel bonding signal from a digital band signal corresponding to the predetermined frequency band according to an external channel selection command.

7. The channel bonding receiving apparatus of claim 1, wherein the channel routing unit sets each of paths of the extracted channel bonding signals according to an external channel routing command such that each of the extracted channel bonding signals routes to the corresponding demodulator.

8. The channel bonding receiving apparatus of claim 1, wherein the channel bonding broadband signal is a cable signal that is transmitted through a hybrid fiber-coaxial (HFC) network.

9. A channel bonding receiving method, the method comprising:
  receiving a channel broadband signal in a single cable modem,
  where the received channel broadband signal has at least one or more channel bonding signals bonded to each of at least two or more different frequency bands,
  performing a tuning operation for respectively dividing the channel bonding broadband signal into a plurality of band signals, and down-converting the divided band signals;
  performing an analog-to-digital converting operation for converting each of the down-converted band signals into a digital band signal;
  performing a channelizing operation for respectively extracting channel bonding signals from each of the digital band signals; and
  performing a signal allocating operation for allocating each of the extracted channel bonding signals to a corresponding demodulator;
  the tuning operation respectively divides the band signals from the channel bonding broadband signal by each frequency bands of the different frequency bands, and divides a band signal corresponding to a predetermined frequency band in the different frequency bands from the channel bonding broadband signal; and
  the channelizing operation respectively extracts the channel bonding signals contained respectively in the different frequency bands from each of the digital band signals, and extracts a channel bonding signal corresponding to the predetermined frequency band from each of the digital band signals.

10. The channel bonding receiving method of claim 9, wherein the tuning operation down-converts the divided band signals such that a center frequency of each of the divided band signals is located in an intermediate frequency (IF) band.

11. The channel bonding receiving method of claim 9, wherein the tuning operation divides the band signal corresponding to the predetermined frequency band according to an external band tuning command.

12. The channel bonding receiving method of claim 9, wherein the channelizing operation extracts the channel bonding signal from a digital band signal corresponding to the predetermined frequency band according to an external channel selection command.

13. The channel bonding receiving method of claim 9, wherein the signal allocating operation sets each of paths of the extracted channel bonding signals according to an external channel routing command such that each of the extracted channel bonding signals routes to the corresponding demodulator, and transmits each of the extracted channel bonding signals to the corresponding demodulator.

* * * * *